United States Patent [19]

Budow et al.

[11] Patent Number: 5,625,864
[45] Date of Patent: *Apr. 29, 1997

[54] INTERACTIVE DIGITAL VIDEO SERVICES SYSTEM WITH STORE AND FORWARD CAPABILITIES

[76] Inventors: Harry S. Budow, 5904 Kensington Dr., Plano, Tex. 75093; Glen E. Alcorn, 2509 Deep Valley Trail, Plano, Tex. 75023

[*] Notice: The term of this patent shall not extend beyond the expiration date of Pat. No. 5,521,631.

[21] Appl. No.: 497,728

[22] Filed: Jun. 30, 1995

Related U.S. Application Data

[63] Continuation of Ser. No. 248,890, May 25, 1994, Pat. No. 5,521,631.
[51] Int. Cl.⁶ .................................................. H04N 7/173
[52] U.S. Cl. .............................. 455/4.2; 455/5.1; 348/3; 348/7; 348/8; 348/13
[58] Field of Search ......................... 348/6, 7, 12, 13, 348/8; 455/4.1, 4.2, 5.1, 6.1, 3.1, 6.2, 6.3; 358/86; H04N 7/16, 7/173

[56] References Cited

U.S. PATENT DOCUMENTS

| | | | |
|---|---|---|---|
| 4,916,737 | 4/1990 | Chomet et al. | 348/3 |
| 4,947,244 | 8/1990 | Fenwick et al. | 348/8 |
| 5,027,400 | 6/1991 | Baji | 348/10 |
| 5,077,607 | 12/1991 | Johnson et al. | 348/13 |
| 5,130,792 | 7/1992 | Tindell et al. | 348/7 |
| 5,133,079 | 7/1992 | Ballantyne et al. | 348/7 |
| 5,172,413 | 12/1992 | Bradley et al. | 348/7 |
| 5,247,347 | 9/1993 | Litteral et al. | 348/7 |
| 5,341,474 | 8/1994 | Gelman et al. | 348/7 |
| 5,357,276 | 10/1994 | Banker et al. | 348/7 |

*Primary Examiner*—John K. Peng
*Assistant Examiner*—Chris Grant
*Attorney, Agent, or Firm*—Haynes and Boone, L.L.P.

[57] ABSTRACT

An interactive video services system for enabling store and forward distribution of digitized video programming is disclosed. In accordance with a feature of the present invention, encoded and compressed digital video signals are transmitted via satellite link from a centrally located uplink site to a plurality of hospitality establishments, where the digitized video programming is stored in the memory of a video server computer or is transmitted "real-time" to the hospitality establishment's customers. The establishment either has its own downlink facilities or shares downlink facilities with other hospitality establishments. The uplink facility and satellite can transmit a variety of video signals—including video signals for real-time viewing by customers, compressed video signals for storage and subsequent retrieval and viewing by customers, and other types of digitized data, such as advertisements and barker screens. Various signal types, including operating system updates and digitized menus and advertisement graphics for the video programming, are separated and appropriately processed and routed at the hospitality facility.

16 Claims, 4 Drawing Sheets

INTERACTIVE DIGITAL VIDEO SERVICES SYSTEM WITH STORE AND FORWARD CAPABILITIES

This is a continuation of application Ser. No. 08/248,890 filed on May 25, 1994, now U.S. Pat. No. 5,521,631.

FIELD OF THE INVENTION

The invention relates generally to video services systems for use in hospitality establishments and, more specifically, to an interactive video services system for enabling store and forward distribution of digitized video programming.

BACKGROUND OF THE INVENTION

It is well known that hospitality establishments, herein defined as hotels, motels, hospitals, condominiums and the like, operate in a highly competitive environment. In order to attract customers and generate additional revenue, such hospitality establishments often offer a wide variety of services, including an assortment of video entertainment services. In addition to broadcast and cable television, hotels and motels often have video services systems that offer pay-per-view and video-on-demand services, as well as a variety of interactive services. Pay-per-view services are scheduled movie services that generally utilize analog video cassette players installed in a remote location within the facility. The cassette players are preloaded with selected video cassette tapes to be broadcast at predetermined, or scheduled, times. The programming can be accessed by multiple television sets (TVs) at any given time while the transmission is in progress.

Video-on-demand services enable customers to select a program to be viewed at their convenience. Viewing times are not prescheduled and customers are typically given a choice of a large number of programming alternatives (typically from eight (8) to fifty (50)). Typically, the selected programming is transmitted in such a manner that only the customer that selected the programming is able to receive the broadcast. Alternatively, some video-on-demand systems provide "join-in-progress" capability, such that other customers also may view the selected programming. As with pay-per-view, the programming is stored on analog video cassette tapes. A video-on-demand system may include a robotic device that removes the video tape containing the selected programming from a storage rack and places it in one of several appropriate video cassette players. Alternatively, the system may include large numbers of individual video cassette players—one video cassette player for each video cassette tape. The customer's selection of a particular program activates only the video cassette player containing the desired programming.

Despite the capability of the prior art video services systems, it has become clear that advancements in the art are needed for many reasons. For example, delivery of the video cassette tapes for pay-per-view and video-on-demand services, as well as the maintenance and upkeep for the video cassette players, is labor intensive and costly. In almost all cases, the video services system that provides pay-per-view and video-on-demand programming, as well as broadcast and cable television, is owned and managed by a specialist company (e.g., Spectradyne) and not by the hospitality establishment. This specialist company typically delivers the cassette video tapes for the pay-per-view and video-on-demand services and maintains the video cassette players. It is common to provide six (6) to eight (8) pay-per-view movies and change all of them at least once a month. As previously indicated, video-on-demand systems may offer as many as fifty (50) movies, only twenty percent (20%) of which will typically be changed out in a given month. Typically, an employee of the company which owns and manages the video services system drives to the facility with the video tapes, loads them into the video cassette players, and takes the old tapes back. If the establishment is at an isolated location, the industry standard is to mail the cassette tapes and have the hospitality establishment mail the old tapes back "Cash On Delivery" (COD). Clearly, regardless of the method used to change out the tapes, a not insignificant expense is incurred by either the hospitality establishment or the management company in doing so.

Methods of compressing and encoding digital video signals and delivering encoded and compressed digital video signals to a set top converter by a communication means are well known in the art. The set top converter decodes and decompresses the signals and converts them to NTSC format for delivery to the TV. Methods of storing encoded and compressed digital video signals in a computer referred to as a "video server," as well as methods of transmitting data via satellite, are also well known in the art. Other video delivery systems, such as that described in U.S. Pat. No. 4,947,244 to Fenwick et al., transmit standard, radio frequency signals to room televisions from traditional, mechanical video tape players.

Analog systems, such as Fenwick et al. described above, do not anticipate the integration of digital video servers or the reception of video programming from a centralized video source via transmission means. In addition, such systems do not permit customers to interact with video programming using video cassette recorder (VCR) type commands and do not anticipate the integration of payment means, such as in-room magnetic card stripe readers. Finally, digitized video distribution systems that utilize video servers are beginning to be implemented. U.S. Pat. Nos. 5,133,079, 5,172,413 and 5,130,792 to Ballentyne, Bradley and Tindell, respectively, do anticipate and even explicitly teach the addition of a digital video server to the system, but at the expense of an entire network upgrade. These systems require the addition of sophisticated switching systems, such as asynchronous transfer mode switches, new transmission networks, and set top units that can decode the transmissions.

Accordingly, the foregoing solutions suffer certain deficiencies, due to the fact that the hospitality market requires access to video server technology, without the expense of implementing switches, networks and set top units mentioned above and without waiting for other entities, such as local television companies and cable television companies, to test and implement new systems. Therefore, what is needed, and what has heretofore been lacking in the art, is an effective method and system for delivering encoded and compressed digital signals to customers of hospitality establishments using a video services system.

SUMMARY OF THE INVENTION

The foregoing problems are solved and a technical advance is achieved by an interactive video services system for enabling store and forward distribution of digitized video programming. In a departure from the art, encoded and compressed digital video signals are transmitted via satellite link from a centrally located uplink site to a plurality of hospitality establishments, where the digitized video programming is stored in the memory of a video server computer or is transmitted "real-time" to the hospitality establishment's customers. The establishment either has its own downlink facilities or shares downlink facilities with other hospitality establishments. The uplink facility and satellite can transmit a variety of video signals—including video signals for real-time viewing by customers, compressed video signals for storage and subsequent retrieval and viewing by customers, and other types of digitized data, such as advertisements and barker screens. Various signal types, including operating system updates and digitized menus and advertisement graphics for the video programming, are separated and appropriately processed and routed at the hospitality facility.

In the preferred embodiment, the principle elements of the interactive video services system of the present invention include a plurality of integrated receiver decoders (IRDs), a systems control computer and a video server computer, all of which are located at the hospitality establishment. The IRDs are connected to a down link facility of the hospitality establishment and to receive and deliver real-time video and audio transmissions from the satellite downlink facility to the hospitality establishment's MATV system to be accessed by customers via in-room TVs. In addition, the IRDs receive and deliver encoded, compressed video programming signals from the downlink facility to the video server computer and are also capable of receiving and delivering other types of data signals from the downlink facility to the systems control computer, via an intelligent radio frequency (RF) modem, for providing advanced video services.

The systems control computer provides the logic support for the video services system, including the video server. The systems control computer is connected to a plurality of TVs located in customer rooms of the hospitality establishment. The computer receives programming requests from customers and transmits commands to the video server or some other video source. Similarly, the systems control computer is connected to a variety of on-premises and off-premises data bases, including the establishment's computerized property management system, and to a computer terminal at the establishment's front desk. The systems control computer stores and processes the billing data and other transaction information. In addition, the systems control computer is capable of generating graphic, audio and video prompts. These prompts are displayed and/or broadcast on the in-room TVs and help explain to customers what services are available, clarify how to access and utilize various services, and assist customers in the selection of and payment for video programming. For this purpose, the systems control computer includes sound and graphics boards or is connected to a processor that contains sound and graphics capability.

The systems control computer is connected to the room terminals and TVs via a video distribution network. In one embodiment, the video distribution network is comprised of coaxial cable and is used for the transmission of RF signals. In this embodiment, the systems control computer is connected to the video distribution network by graphics channels and via an intelligent RF modem. In an alternative embodiment, the video distribution network can be fiber optic, in which case signaling may be digital, rather than of RF.

Additionally, in the preferred embodiment, the systems control computer is connected to the video server by an Ethernet local area network (LAN). Alternatively, this connection between the systems control computer and the video server can be some other type of LAN, such as Token Ring, can be a direct digital link, or the two components could reside in the same unit. The systems control computer is capable of storing digitized audio, video and graphic data. This data can be transmitted to customers' rooms and broadcast on in-room TVs in the form of barker screens and advertisements, which may be transmitted from the systems control computer in place of standard broadcast advertising.

In a preferred embodiment, the video server is capable of storing a minimum of twenty (20) feature length video programs, or movies, for video-on-demand and pay-per-view viewing by an establishment's customers and is also capable of storing digitized advertisements. The video server receives encoded, compressed video program data from the IRDs via an RS 449 Opportunistic Data link or a full bandwidth link, for example. The encoded data is stored on a hard disk array within the video server. Once a movie is selected, the associated video data is converted from a standard MPEG format, for example, MPEG 1, MPEG 2 or some derivative thereof, into an RF format and is transmitted to the appropriate in-room TV(s) via the property's MATV network.

In a particular room of the establishment, a customer utilizes a TV remote control unit, the room TV and the room terminal to access the video services system and order video-on-demand services. Typically, the customer will choose programming from a menu of choices. The customer inputs the selection utilizing the remote control unit or a keyboard on the room terminal. The room terminal functions as a modem and transmits the selection to the systems control computer. The room terminal also prevents unauthorized viewing of the programming.

In the preferred embodiment, all video-on-demand and pay-per-view programming is received via the downlink with the satellite. Some programming is stored in the video server, while other programming is transmitted real-time to the in-room TVs over the establishment's internal video distribution network. In an alternative embodiment, additional video storage devices also can be connected to, and controlled by, the systems controls computer. For example, the systems control computer can control traditional video tape players and the robotic tape racks described above. These analog systems can be used to augment the programming selection provided by the video server or can be used as a backup system in case the video server fails.

In another aspect of the invention, because the video server and associated systems control computer are located on the premises of the hospitality establishment, customers can easily interact with those computers to control the video programming. Accordingly, customers can utilize video tape play-type commands (e.g.,"pause," "fast forward," and "bookmark"), play video games, or, as new interactive multimedia products are developed, interact with the programming to an even greater degree. The "bookmark" application functions similar to a bookmark used to mark a page in a book. The systems control computer and the video server function together to "remember" where the particular customer implemented the bookmark application until the customer can retrieve the video program and begin viewing where he or she left off.

A technical advantage achieved with the invention is that video programming can be delivered to a plurality of hospitality establishments, which can be located internationally, via a single satellite source from a single centralized video library source.

A further technical advantage achieved with the invention is that the digitized video programming can be stored at the premises of the hospitality establishment for an indefinite period of time.

A further technical advantage achieved with the invention is that, because the video programming is stored as digital signals in a video server, the video signals are not susceptible to the type of degradation typically associated analog signals stored on magnetic tape and other media.

A further technical advantage achieved with the invention is that transmission and storage of digital encoded data is more secure than broadcast analog signals and video tape, thereby providing an advantage to the major entertainment studios that retain ownership rights to the programming.

A further technical advantage achieved with the invention is that multiple customers at the hospitality establishment can access any given digitized video program, including programming already being viewed by other customers. In this manner, customers can access the digitized video programming at a time of their choosing.

A further technical advantage achieved with the invention is that customers can use TV remote control units to select and control video-on-demand programming.

A further technical advantage achieved with the invention is that advertising can be transmitted from the systems control computer or the video server in place of advertising received from the standard broadcast TV networks. This advertising can be transmitted to the TV in place of advertising from broadcast or cable television.

A further technical advantage is that the room terminal can be used to prevent unauthorized access to video-on-demand programming.

A further technical advantage achieved with the invention is that multiple types of data can be received simultaneously from the satellite downlink facility and then transmitted to the appropriate storage facility or converted to RF signals for transmission directly to in-room TVs.

A further technical advantage achieved with the invention is that the customers of the hospitality facility are able to interact with and control the video programming without having to transmit upstream signals to a destination away from the hospitality establishment. Low speed upstream transmissions are subject to signal degradation and time delays-generally based on the distance that the signals must travel. Hence, because of the proximity of the interactive keypad/remote control unit to the systems control computer, signal degradation and time delays are significantly reduced such that they are virtually imperceptible to the customer.

A further technical advantage achieved with the invention is that linking the remote control, the TV, the room terminal, the systems control terminal and the video server, enables the provision of interactive capability not previously available to a hospitality establishment customer.

DETAILED DESCRIPTION OF THE INVENTION

Figure 1:
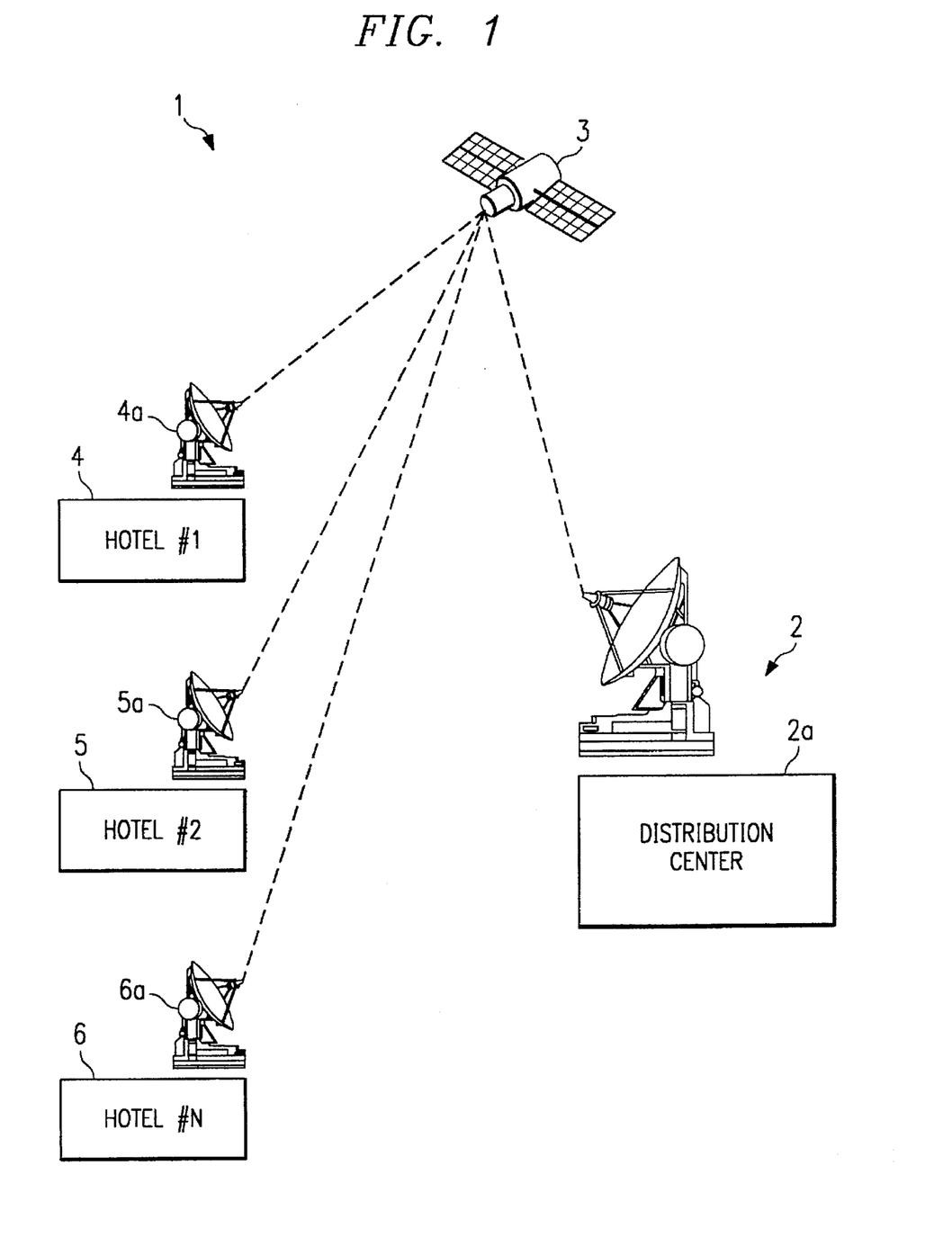
FIG. 1 is a block diagram of a centralized distribution center and satellite delivery network for use in implementing the system of the present invention.

Referring to FIG. 1, a centralized distribution center and satellite delivery network for use in implementing the system of the present invention is designated by a reference numeral 1. The network 1 comprises an uplink facility 2 for transmitting encoded and compressed digital video programming signals stored in a distribution center 2a to a satellite 3. Once received by the satellite 3, the video data signals are relayed to a plurality of hospitality establishments, which in the illustrated embodiment are represented by hotels 4, 5 and 6. In the illustrated embodiment, each of the hotels 4, 5 and 6 has its own downlink facilities 4a, 5a and 6a, respectively, it being understood that in an alternative embodiment, multiple hospitality establishments will share downlink facilities. For example. Spectradyne, Inc., a unit of SIP Holding, Inc., currently uses Electronic Data Systems Corp. (EDS) to transmit digitized, encoded programming from its facilities in Dallas, Texas to a satellite similar to the satellite 3. The satellite then retransmits the programming to numerous hotels serviced by Spectradyne located both within and outside the United States.

In a preferred embodiment, the digital programming is encoded according to standards set by the Motion Picture Experts Group (MPEG); however, other encoding and compression standards, including proprietary standards, could also be utilized. In the illustrated embodiment, the encoded data is converted to microwave radio signals and is transmitted from the uplink facility 2 to the satellite 3. In addition, "real-time" video programming and other digitized data can be transmitted simultaneously utilizing the uplink facility 2 and satellite 3 to a plurality of hotels 4, 5 and 6.

In an alternative embodiment, transmission means other than the satellite delivery network 1 may be used. Encoded data may be transmitted by any means available, for example, the data may be transmitted by microwave means or over fiber optic transmission means. In addition, the encoded data may be transmitted over public and/or private telecommunications networks.

Figure 2:
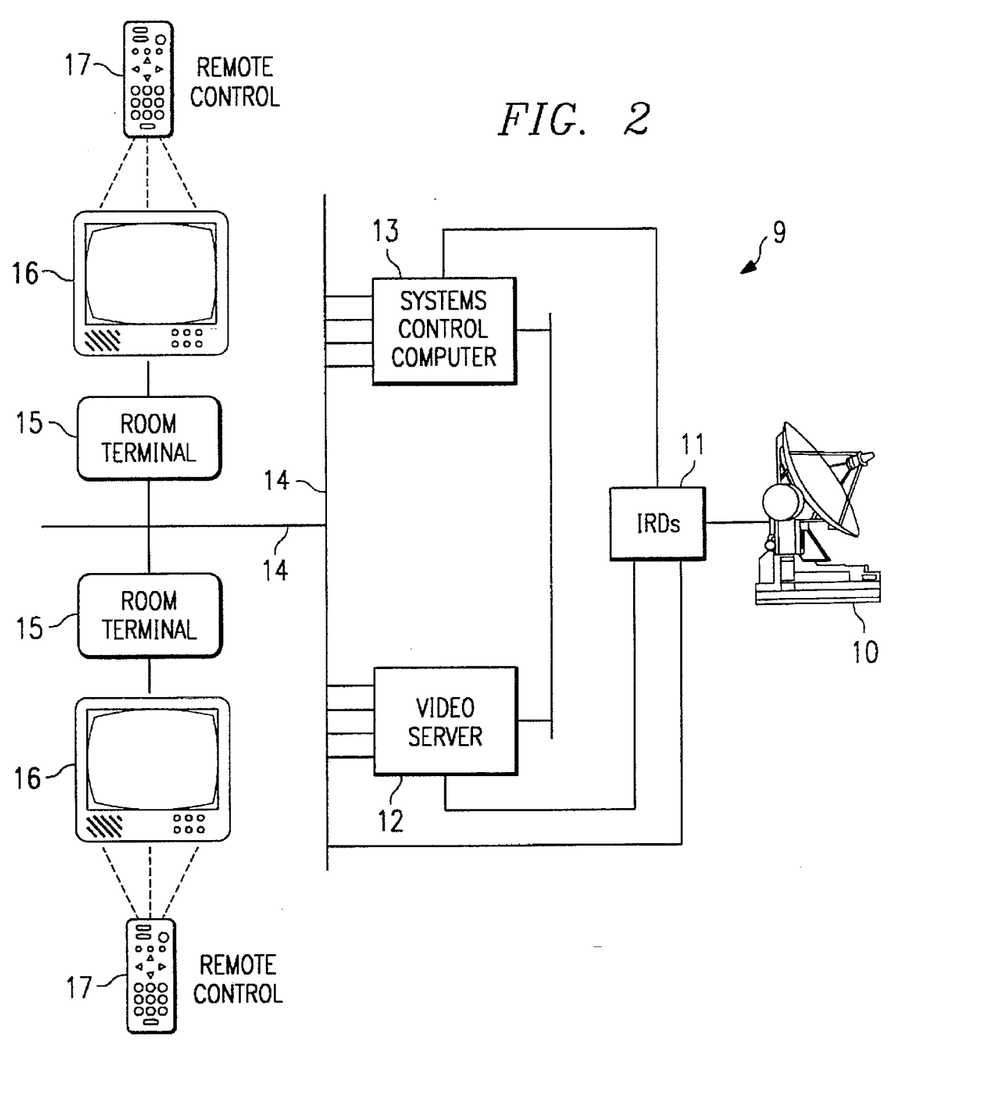
FIG. 2 is a block diagram of a video services system embodying features of the present invention.

FIG. 2 is a block diagram of a video services system 9 embodying features of the present invention. In FIG. 2, video program data transmitted via a satellite delivery network, such as the delivery network 1 (FIG. 1), is received by a downlink facility 10, which is identical to the downlink facilities 4a, 5a and 6a (FIG. 1). The received video data is transmitted to a plurality of integrated receiver decoders (IRDs) 11 for determining the type of programming comprising the data, based on header information, the type of encoding scheme utilized and/or the frequency range of the received video data, and then processing and routing the data accordingly. For example, if the received video data is encoded utilizing MPEG 2, it is transmitted to a video server 12. If the video data is encoded utilizing a proprietary coding scheme, it is decoded, decompressed, and converted to RF signals for transmission on a distribution network 14 of the hospitality's establishment as "real-time" video programming. If the data being processed is non-video data, or if the data is for barker screens or audio/video advertisements, the data is transmitted to a systems control computer 13. Typically, the systems control computer 13 receives data such as operating system updates, on-screen movie menus, synopses of the video-on-demand programming, and advertisements graphics. Advertisements may also be stored in the video server 12. Likewise, if the data falls within a predetermined frequency range, it is determined to be a certain program for real-time transmission. Data in another predetermined frequency range is a separate program.

Both the video server 12 and the systems control computer 13 are connected to a plurality of room terminals, represented by a room terminal 15, and a plurality of in-room TVs, represented by a TV 15, by the video distribution network 14. Typically, the network 14 is a radio frequency (RF) network, in which data is transmitted in a RF format to the room terminal 15 via the network 14. Data also could be transmitted via video distribution network 14 in a digital format. Moreover, it is possible that the network 14 could be constructed using fiber optical cable.

Often, the video distribution network 14 is configured in a trunk/branch structure. In smaller establishments, numerous branches of coaxial cable connect to a single trunk, while larger hospitality establishments may have a plurality of trunks, each of which may be associated with a particular floor of the establishment, each with a plurality of branches. The plurality of trunks allows the systems control computer 13 to allocate channel band width for multiple programming. For example, channel 72 can be allocated for the transmission of a movie A on the trunk associated with the second floor of a hotel, while at the same time, a movie D may be transmitted on channel 72, on the trunk associated with the third floor of the hotel.

The video distribution network 14 is connected to a plurality of room terminals represented by room terminals 15. Generally, in a hospitality facility, each of the guest rooms will have one room terminal per TV. The room terminal 15 interfaces with the systems control computer 13, the video server 12 and other video sources controlled by the computer 13 (not shown), and an in room TV 16. The room terminal 15 is usually a self-contained unit, but can also be a "smart tap" connected to the wall or reside within the TV 16. The room terminal 15 can have two or more external buttons or a full keypad for use by the customer in selecting programming and changing television channels. Alternatively, the room terminal 15 may have no external keys, in which case the customer uses a remote control 17 and alternative channel changer means of the TV 16 (not shown) to perform the aforementioned functions. The room terminal 15 is utilized to control reception of the broadcast television and special pay-per-view and video-on-demand programming. The room terminal 15 also controls use of interactive video services by providing a user interface to the systems control computer 13 and various system applications.

There are several methods by which the room terminal 15 can transmit data to the systems control computer 13. Some room terminals transmit video data directly to the computer 13 immediately upon receipt thereof. Other room terminals temporarily store the data and transmit only after being polled by the computer 13.

The TV 16 and remote control unit 17 are preferably standard units. Some TVs which are currently available include the functionality of the room terminal 15, such that a separate unit is not needed. In addition, some TVs use unique protocols to communicate with the associated room terminals. Moreover, as will be shown and described with reference to FIG. 5, the room terminal 15 and/or the TV 16 may be connected to magnetic card reading devices that are capable of reading and transmitting credit and debit card information to the systems control computer 13 for validation.

In operation, data is received by the downlink facility 10 and transmitted to the IRDs 11. The IRDs 11 decode and decompress all "real-time" pay-per-view programming, i.e., programming to be immediately broadcast to customers at prescheduled times, and directly transmit such programming in an RF format to the video distribution network 14. It is anticipated that in a future embodiment, "real-time data" actually may be transmitted and received several times faster than real-time. The customer uses the remote control 17 to change the TV 16 (or the room terminal 15) to an appropriate channel to receive the pay-per-view programming. If the customer chooses the programming, the room terminal 15 notifies the systems control computer 13, and a billing record is established. Alternatively, the systems control computer 13 monitors the room terminal 15, records that the customer has chosen pay-per-view programming, and establishes a billing record.

Figure 3:
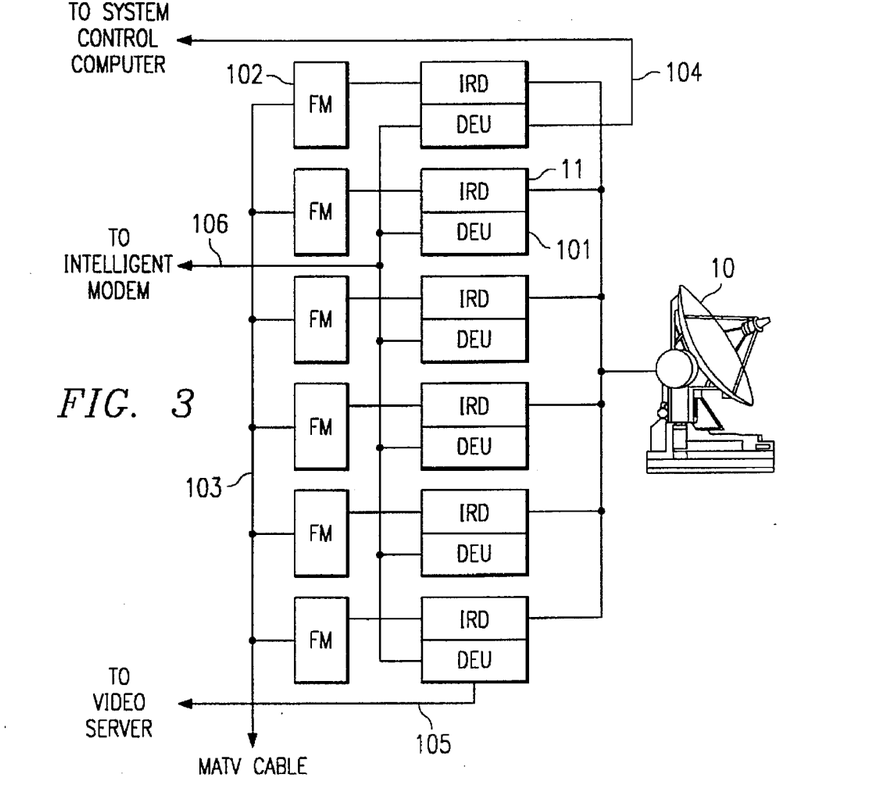
FIG. 3 is a detailed block diagram of several integrated receiver decoders of the video services system of FIG. 2.
Figure 4:
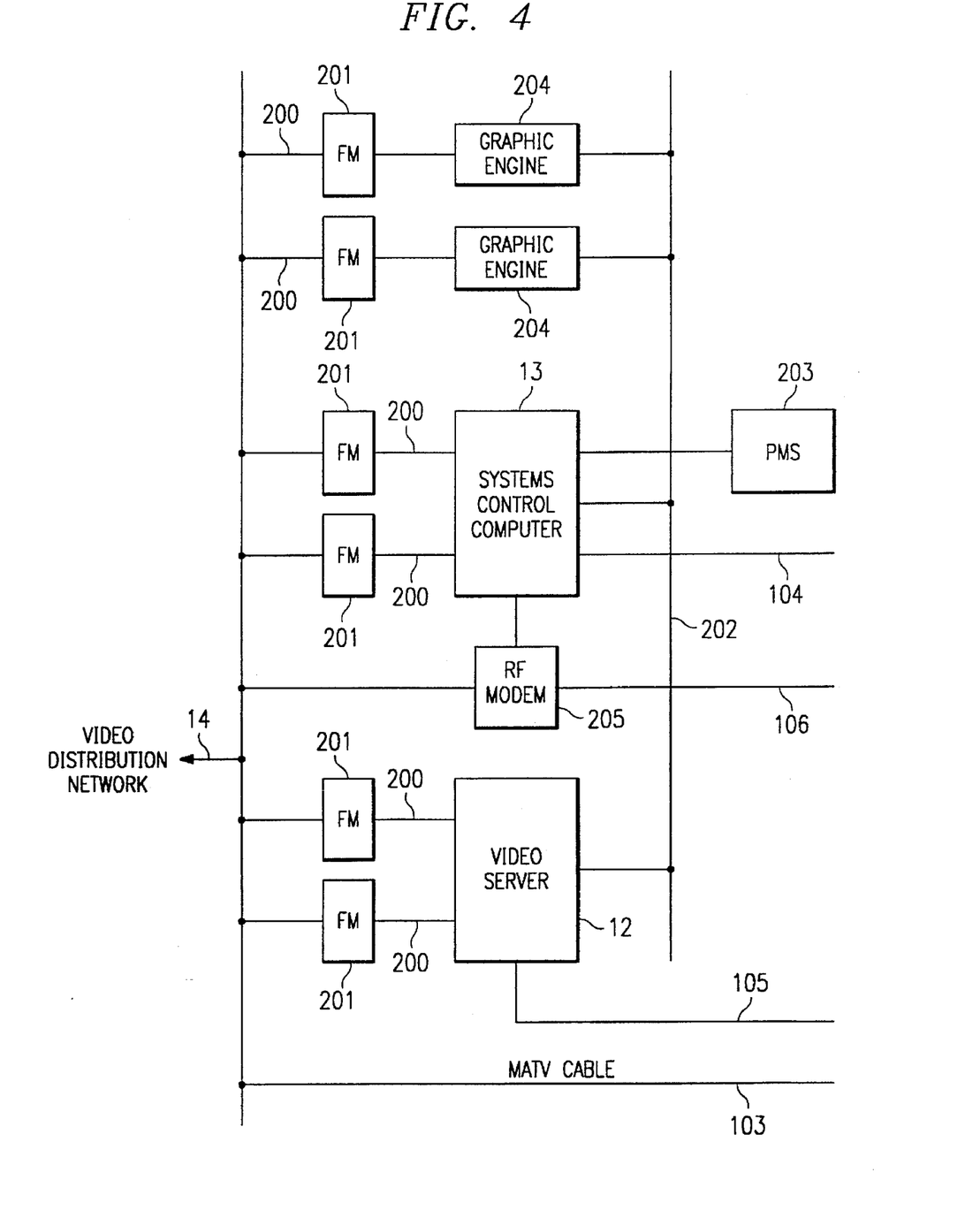
FIG. 4 is a detailed block diagram of the video server and the systems control computer of the video services system of FIG. 2.

FIGS. 3 and 4 are detailed functional block diagrams of select portions of the system 9 of FIG. 2. Referring to FIG. 3, the downlink facility 10 receives encoded data signals from the satellite 3 (FIG. 1) and transmits the received data signals to the IRDs 11 at a bit rate of 3.3 or 6.6 megabits per second (mbps). It should be understood that the data signals will typically have been previously multiplexed utilizing a known frequency multiplexing format. In addition, it is common that the data is transmitted in packets of information. In one embodiment, the IRDs 11 can be the type manufactured by Compression Lab, Inc. Although not shown, it should be understood that each IRD 11 includes a satellite quadrature phase shifting keying (QPSK) demodulator and a video/audio decoder. Each IRD 11 is programmed to decode signals within a preselected frequency range. Generally, the video services system 9 (FIG. 1) would have one IRD 11 for each item of "real-time" pay-per-view programming transmitted by the satellite 3; that is, if the system commonly receives eight separate pay-per-view programs, it will have eight IRDs 11.

In addition, each IRD 11 includes a data expansion unit (DEU) 101. The DEUs 101 are modules added to the IRDs 11 and provide ports for an RS-232 serial connection and an RS-449 connection for data transfer to the video server 12. The DEUs 101 enable the IRDs 11 to transmit digital data directly to the systems control computer 13 via an RS-232 serial port and transmission means 104. The DEUs 101 also enable the IRDs 11 to transmit digital data directly to the video server 12 via an RS-449 port and transmission means 105.

Each IRD 11 is connected to a frequency modulator 102, to which it outputs standard NTSC audio/video signals. Each frequency modulator 102 converts the NTSC audio/visual signals received from the IRDs 11 to an RF format. The frequency modulators 102 modulate the signals to an appropriate television carrier frequency for tuning reception by the room terminal 15 or TV 16. The modulated signals are then transmitted via transmission means 103 to the video distribution network 14 (FIG. 2). In addition, all of the IRDs 11 are connected, via the associated DEUs 101, to an intelligent RF modem (described in FIG. 4). The intelligent modem (FIG. 4) monitors the IRDs 11 to determine service status and to issue channel change commands.

In addition, the IRDs 11 are capable of differentiating between data within a given packet of information. For example, when video programming is encoded, some packets contain data for an entire screen, or portion of a screen, and other packets only contain data representing changes that occur to the given screen. The second type of packet often does not contain enough data to be a complete packet. Accordingly, data for other video programs can be added to the packet. With this invention, encoded data for the videoon-demand programming, which will be stored in the video server 12 (FIG. 2), are added to packets for the "real time" pay-per-view programs. This data is separated by the IRDs 11 and transmitted, still in its encoded format, to the video server 12.

In FIG. 4, the IRDs 11 (FIG. 3) are connected to the video server 12. The video server 12 is primarily used to store encoded, digitized video programming for video-on-demand services. The preferred embodiment is implemented using a video server provided by EDS Corporation. Although not shown, it should be understood that the video server 12 comprises a plurality of video disk drives in a video disk drive array, a video disk array controller, MPEG decoder circuit boards, and two processors, including a store-and-forward processor and a server processor. The video disk drives allow only read-only access by customers. During operation, the store-and-forward processor receive the downloaded video programming data files from the IRDs 11 and the DEUs 101 via link 105. The store-and-forward processor reconstructs the video programming data files and insures file integrity. Once rebuilt, the files for the video program are forwarded to the server processor. The server processor transmits the data files to the video disk derive array. The store-and-forward processor also interfaces, via protocols, with the systems control computer 13. When the store-and-forward processor receives a command to transmit a movie, a command is issued to the server processor. The server processor commands the disk array to download data files to the MPEG decoder circuit board, once decoded, the program is transmitted to the video distribution network 14 via a plurality of analog video links 200. Each modulator 201 is utilized to modulate the signals to an appropriate television carrier frequency for tuning reception by the room terminal 15 or TV 16. In the preferred embodiment, the video server 12 is capable of switching any given programming to be output on any decoder channel. Alternatively, a video distribution switch (not shown) can be added to the system 9 between the video server 12 and the frequency modulators 201. Such a switch would function as a crosspoint switch and would allow the systems control computer 13 to allocate use of the links 200.

In accordance with a feature of the present invention, more than one customer can simultaneously view the same video program and can even begin viewing the selected video program at different times. The read-only files that are stored on the video disk drive can support multiple accesses. Based on a customer command, the server processor directs the data corresponding to the selected video program to a separate MPEG decoder circuit board. The video data is decoded and transmitted to the designated room terminal 15 and TV 16 via a separate link 200.

In the preferred embodiment, the video server 12 is a modular configuration, with the initial module capable of storing twenty (20) to thirty (30) programs, such as movies, depending on the length of the program, that are simultaneously accessible to thirty-two (32) customers via their in-room room terminals and associated TVs. Additional modules would enable this video server 12 to store as many as 900 full length movies that are simultaneously accessible to hundreds of viewers. However, for the hospitality market, it may not be necessary for a video server ever to store a library of more than fifty (50) to one hundred (100) full length video programs. Because of the architecture, the video server 12 constantly can be updated with popular programming, while less popular programming is erased. All programs are available to all room terminals 15/televisions 16 connected to the system 9 at any time.

The video server 12 receives commands from the systems control computer 13, which instructs the server 12 regarding which programming to play, when to play the programming and which room terminals are to receive the programming. The video server determines the transmission channel and channel selection back to the systems control computer 13 via the Ethernet LAN 202. The system 9 can be configured so that only one customer or multiple customers can access a particular video-on-demand program stored in the server 12 at a given time.

The video server 12 decodes video data comprising a selected movie using MPEG standards and transmits the decoded data utilizing radio frequencies. The video server 12 also can store the video programming data for scheduled pay-per-view programming. At a scheduled time, the systems control computer 13 commands the video server 12 to transmit the selected program on a channel that can be accessed by all the hospitality establishment's customers. The systems control computer 13 monitors the room terminals in order to determine which customers access the programming and should be billed for the services.

The video server 12 is connected to the systems control computer 13 via an Ethernet LAN 202. The systems control computer 13 provides logic support for the video server 12 and comprises a processor for data processing capability, hard drive storage for storing control and program algorithms, and read only memory (ROM) and random access memory (RAM). In one embodiment, the systems control computer 13 is a personal computer that utilizes an Intel 486 DX processor, 33 MHz with a 210 MegaByte ICE hard disk and the SCO Lite UNIX Operating System, although it should be understood that a variety of other computer configuration s can be utilized. In addition, the systems control computer 13 will include custom applications software, sound boards and multichannel graphics circuit boards. The computer 13 is capable of generating graphics screens, as well as video and/or audio prompts, to interact with customers.

The systems control computer 13 is connected to the room terminals 15 (FIG. 2), via the video distribution network 14. The computer 13 receives information from the room terminals 15, and utilizes the received information to provide video and other services for the customer. The systems control computer 13 is also connected, preferably via RS-232 serial links, to the hospitality establishment's property management system (PMS) 203, a printer (not shown), a front desk terminal (not shown). These connections allow the systems control computer 13 to integrate the video services system 9 with the hospitality establishment's billing system to provide a variety of customer and billing services. In addition, the computer 13 contains a 9600 baud modem (not shown). The modem enables remote access by the management company in order to download records and perform remote diagnosis of all system computers and allows the computer 13 to access remote data bases and services.

The systems control computer 13 is connected to the video server 12 and to graphics engines 204 via the Ethernet LAN 202. LAN operating software resides within the computer 13. The systems control computer 13 communicates with the video server 12 with a proprietary and copyrighted protocol. The computer 13 receives commands for video-on-demand programming from the room terminal 15 and send commands to the video server 12 to cause the server 12 to broadcast, or "play" the selected program. In addition, the computer 13 monitors the video server 12 to determine which programs are available and which programs are being watched. The computer 13 performs diagnostics and status tests on all channels in the video server 12 system. Likewise, the video server 12 can store the data for pay-per-view programming, in which case, the systems control computer 13 must include scheduling instructions and a timing means such that at prescheduled times, the systems control computer 13 can transmit a command to the video server 12 regarding which programming to play and which room terminal 15 is to receive the programming.

The graphics engines 204 are utilized to distribute some audio, video and graphics applications from the computer 13 to remote processors. The graphics engines comprise a processor (motherboard), graphics card, Ethernet card, and audio sound card. The disk operating system and Windows applications for the graphics engines 204 reside in the systems control computer. The graphics engines are utilized for generating audio/visual prompts, barker screens, and other advertisements and similar applications, which the systems control computer 13 can cause to be displayed on the TV 16 in place of broadcast advertising. The systems control computer 13 also can be connected, via the Ethernet LAN, to CD ROM units (not pictured).

The systems control computer 13 is connected to an intelligent RF modem 205 via an RS 232 serial link. Alternatively, the modem 205 may be internal to the computer 13. The RF modem 205 is utilized to convert computer communications signals to the room terminals 15 from a digital format to RF signals. In the preferred embodiment, the modem 205 includes its own limited processing capability. Therefore, instead of utilizing the processing capability of the computer 13 to initiate communications to the room terminals 15 or the IRDs 11, the intelligent RF modem 205 may poll, communicate, and receive data at its own initiative and connects the appropriate terminals to the computer 13 only for status changes. As described above, the RF modem 205 provides a command and status interface with the IRDs 11.

The systems control computer 13 is directly connected to the IRDs 11 via the RS 232 serial link 104. Data for scheduling and billing, as well as audio/visual data for advertisements, can be transmitted to the hospitality establishment via the satellite 3 (FIG. 1) or through another communications network. This data can be differentiated from other video data by the IRDs 11 and transmitted directly to the systems control computer 13 via link 104. If the data for advertisements is in the MPEG format, it will be transmitted directly to the video server 12 via link 105.

As previously indicated, the systems control computer 13 and the graphics engines 204 are connected to the video distribution network 14 by a plurality of links 200. Each link 200 is connected to a frequency modulator 201. The frequency modulator 201 is utilized to modulate the signals to an appropriate television carrier frequency for tuning reception by the room terminal 15 or TV 16. Alternatively, a video distribution switch (not shown) may be added to the system between the systems control computer 13/graphic engines 204 and the frequency modulators 201. As described previously, this switch would function as a crosspoint switch and would allow the systems control computer 13 to allocate the use of the channels.

In an exemplary operation, a customer responds to a menu displayed on the TV 16 that lists programming stored in the video server 12 by using the remote control unit 17 to select items from the menu. Infrared signals generated by the remote control unit 17 are transmitted to the TV 16, which transmits the signals to the data processor 401 of the room terminal 15. These signals, along with the unique address of the room terminal 15, are transmitted to the systems control computer 13. The systems control computer 13 processes the request and issues commands to the video server 12 via the Ethernet LAN 202. The systems control computer 13 also transmits audio/video or graphic instructions to the TV 16 instructing the customer to tune the TV 16 to a specific channel frequency bandwidth, such as that represented by channel 15, to receive the programming. Alternatively, the room terminal 15 can tune the channel for the customer. The systems control computer 13 processes billing information entered by the customer, if such billing information is entered using a card reader 401 (FIG. 5) or the remote control unit 17, or adds the charge for the service to the room bill by accessing the establishment's property management system 403 via an RS 232 serial link. In addition, the systems control computer 13 transmits commands to the video server 12 and frequency modulators 201 designating a channel for transmitting the selected program.

Upon receipt of a particular command from the systems control computer 13, the video server 12 begins downloading the selected programming from the appropriate disk drives (not shown). In addition, the video server 12 converts the data from MPEG format to NTSC format. Finally, the video server 12 converts the digital data to RF signals. These RF signals are then transmitted to frequency modulators 201, which modulate the signals to the appropriate frequency channel.

As previously stated, the system as described herein allows customers to interact with the programs stored in the video server 12. For example, customers can use the remote control unit 17 to implement a "bookmark" application. This application allows customers to stop the transmission of a selected video program and begin watching the program from the exact same point at a later time, until the program is erased from the video server 12 by the reception of new programming via the delivery network 1. However, time limit parameters for the "bookmark" application can be programmed into the systems control computer 13; for example, bookmarks could be erased after 24 hours. Likewise, when a customer checks out of the hospitality establishment, the systems control computer 13 is notified of the status change by the PMS 203. In response to the notification, the systems control computer 13 could command the video server 12 to erase that customer's bookmark. Accordingly, this application represents an advancement in the art over video server systems that only allow a customer to "pause" the program for short periods of time. The room terminal 15 transmits the signal for the bookmark application via the video distribution network 14 to the systems control computer 13. The systems control computer 13 receives the command and stores the room number, billing information, channel information, and other vital information in its memory. The computer 13 also transmits commands, via the LAN 202, to the video server 12 to cease transmission of the program and to mark in its memory the stopping place. The customer can reactivate transmission of the programming with the remote control 17. The room terminal 15 transmits the command to the systems control computer 13 via the video distribution network 14. The systems control computer 13 receives the transmission and forwards the appropriate data to the video server 12 via the LAN 202 to reactivate transmission of the program from the location of the bookmark.

As another example, the system as described herein is capable of receiving advertisements from the uplink facility 2 and satellite 3 (FIG. 1) and storing them either in the systems control computer 13 or the video server 12. The advertising data is forwarded to the appropriate storage facility by the IRDs 11 and DEUs 101 based on the format of the encoded signals. In addition, data for time schedules for transmitting the advertisement to the room TVs and channel information, as well as header information identifying the advertisement, are transmitted with the advertisement. Typically, such advertisements are shown at scheduled times. For example, a cable news station chooses to let Spectradyne show its own advertisements instead of the regular broadcast advertisements. At the scheduled time, the systems control computer 13 begins to transmit one of the advertisements over links 200. The transmitted advertisement is modulated to the appropriate channel by frequency modulator 201. If the advertisement is stored within a memory of the video server 12, the systems control computer 13 transmits appropriate signals to the video server 12 via the Ethernet LAN 202, identifying the advertisement to be transmitted, the transmission channel over which it is to be transmitted, and other information. The advertisement is transmitted via links 200 to the frequency modulator 201 where it is modulated to the appropriate frequency. In this manner, the customer receives the advertisement transmitted by the systems control computer 13 rather than the one transmitted by the cable television station. Alternatively, instead of scheduled advertisements, some television and cable stations precede their advertisements with a transmitted queue tone. The systems control computer 13 monitors the programming for a queue and upon detecting the tone, the appropriate advertisement is transmitted as described above.

Not only does the system 9 provide the flexibility for the systems control computer 13 to instruct the video server 12 to preempt cable and broadcast television commercials by inserting commercials for pay-per-view and video-on-demand services, the systems control computer 13 can selectively insert commercials based on the viewing habits of each particular customer. The systems control computer 13 retains records of the video-on-demand services and pay-per-view programming purchased by each customer for billing and other purposes. The systems control computer utilizes this data base to determine which programming the customer has already viewed. The systems control computer 13 can delete advertisements for those programs from the commercial transmission schedule algorithm for that customer. Likewise, an algorithm can be used by the systems control computer 13 to select and transmit commercials based on the customer's interests. For example, if the customer has viewed several adventure programs, the systems control computer 13 will determine that the customer prefers adventure programs and command that a larger proportion of advertisements transmitted to that customer are directed toward adventure programs. These advertisements controlled by the systems control computer 13 can reside in hard disk memory of the systems control computer, in the hard disk array of the video server 12 or in a graphics engine 204.

Similarly, cable or network program codes (the identification code for each broadcast program), as well as program schedules, can be input into the systems control computer 13 via the 9600 baud modem (not shown) or the satellite or other communications network link via the IRDs 11 and DEUs 101. For example, the identification code for the movie "Beauty and the Beast" is 83502. As the systems control computer 13 monitors and polls the plurality of room terminals, it determines the channel that a customer is accessing with the TV 16. An algorithm compares that channel with the time of day, the schedule, and the program identification codes. The systems control computer 13 then determines and records in an internal data base the programming viewed by the customer as determined by the customer's room terminal 15. The systems control computer 13 can use the internal data base information to determine what type of programming the customer prefers and then transmit advertisements for similar programming to the customer. For example, if the customer views the movie "Beauty and the Beast" on a cable television channel, the computer 13 commands that a larger proportion of advertisements for the children's programming stored in the video server 12 is transmitted to the room terminal 15 and displayed on the TV 16.

Figure 5:
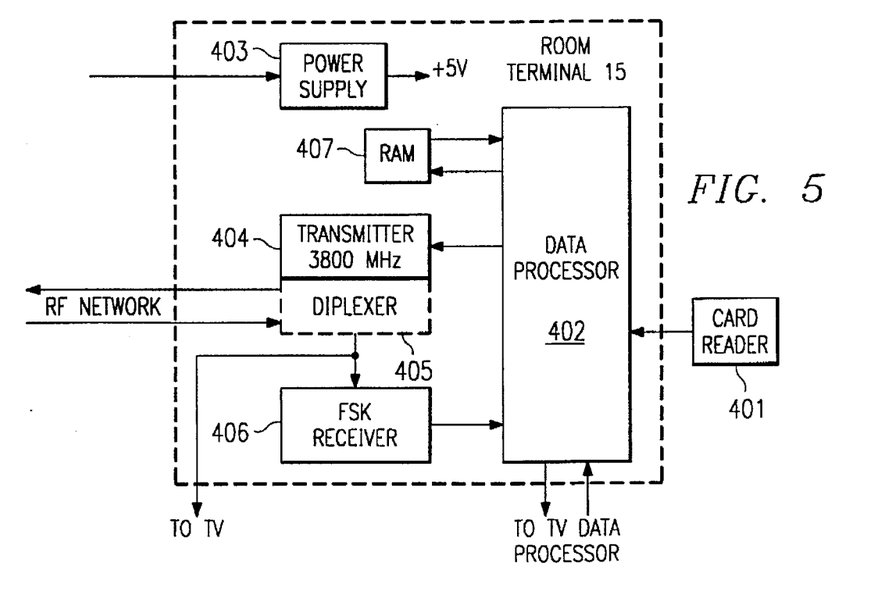
FIG. 5 is a functional block diagram of a room terminal of the video services system of FIG. 2.

FIG. 5 is a functional block diagram of the room terminal 15 With an optional card reader 401. It should be understood that various functions and circuits of the room terminal 15 not directly related to the invention as disclosed herein are not shown or described herein. As previously indicated, many TVs now have internal data processors and infrared receivers and incorporate much of the same capability as room terminals manufactured as recently as five years ago. Because of the increased capability of the TV 16 and duplicated functionality, it has become common in the art for a video services system to utilize room terminals with decreased functionality, but including a data processor, such as the data processor 402, that is capable of interacting, via protocols, with the processor of a TV.

Data processor 402 is connected to a processor (not shown) of the TV 16 via an RJ 11-type interface (not shown). Four of the six wires of the RJ 11 interface, respectively, carry data from the processor 402 to the TV 16 processor, data from the TV 16 processor to the processor 402, infrared data from an infrared receiver (not shown) of the TV 16 to the processor 402, and clock information from the TV 16 to the processor 402.

The room terminal 15 includes a power supply 403, which outputs +5 volts for use by the circuits of the room terminal 15. Because of the low power requirements of the room terminal 15, it can receive power from a wall plug or from the TV 16. A transmitter 404 is utilized by the room terminal to transmit signals to the systems control computer 13. When the transmitter 404 receives data and the appropriate signal from a data processor 402, the resulting signal is output to the systems control computer 13 by means of a diplexer 405.

The diplexer 405 provides capability both to transmit and receive signals over the RF carrier network. Cable or broadcast television signals pass through the diplexer directly to the TV, Commands or other signals from the systems control computer 13 are directed by the diplexer 405 to a frequency shift key (FSK) receiver 406 and then to the data processor 402.

The data processor 402 receives inputs from and controls almost all circuits comprising the room terminal 15. Each room terminal 15 in the hospitality establishment has a unique identification number, or address, that is stored in the processor 402. The processor 402 must at least have adequate processing capability to process billing data received from the optional card reader 401 and commands received from the TV 16, including commands input by the customer with the remote control unit 17. Characteristically, this data is temporarily stored in a nonvolatile random access memory (RAM) 407. Data is read from the RAM 407 and transmitted to the transmitter 404 when requested by the systems control computer 13 (i.e., when the room terminal 15 is polled by the computer 13). Alternatively, the data is read from the RAM 407 and transmitted by the transmitter 404 without being polled by the computer 13 if the communications is initiated by the room terminal 15.

As described above, the data processor 402 interacts with the TV's data processor. Among other functions, the data processor 402 and the systems control computer 13 manipulate the tuning of the TV 16 tuning for reception of video-on-demand programs and to prevent unauthorized access to programming. The systems control computer 13 transmits instructions to customers using audio/video or graphics screens, instructing them to tune to a particular channel frequency bandwidth to view the selected video-on-demand programming. Typically, hospitality video systems reserve a block of channel frequency bandwidth that cannot be tuned by the customer for video-on-demand programs. As previously described, a customer uses the remote control unit 17 to select programming from a menu displayed on the TV 16. Upon receipt of signals from the remote control unit 17, via the TV 16, the room terminal 15 transmits commands to the systems control computer 13 requesting broadcast of the selected video-on-demand program. The systems control computer 13 transmits appropriate commands to the video server 12, including channel frequency bandwidth information. In addition, the systems control computer 13 transmits the commands to the room terminal 15 and the TV 16 instructing that the channel is tuned to the same channel frequency as that being transmitted by the video server 12. The channel frequency actually used is different than the one selected by the customer. In other words, the systems control computer 13 and room terminal 15 cause the selected program to be received at a channel frequency bandwidth different than that selected by the customer.

For example, assuming the customer has tuned the TV 16 to a frequency bandwidth represented by channel 15, the systems control computer 13 and the room terminal 15 will retune the TV 16 to a frequency bandwidth normally inaccessible by the customer (e.g., channel 28) unless a movie or other video-on-demand program is ordered. The customer is unaware of this activity. Other customers that tune to channel 15 will not receive the video-on-demand programming selected by the particular customer. In this manner, and because the process is controlled by the systems control computer 13 and the room terminal 15, unauthorized access to video-on-demand is blocked.

It is understood that variations may be made in the present invention without departing from the spirit and scope of the invention. For example, with the preferred embodiment, each hospitality establishment would contain a plurality of IRDs 11, a systems control computer 13 and a video server 12. As an alternate embodiment, elements of the present invention could be centrally located and utilized to provide pay-per-view and video-on-demand services for a plurality of properties. In another alternative embodiment, the functionality of the systems control computer 13 and the video server 12 can be combined into one computer. In yet another embodiment of the invention, the data that is to be used for the "real-time" video broadcasts first would be transmitted to the video server 12 and then decoded and decompressed by the video server 12, at the command of the systems control computer 13, for transmission to the customers' room TVs.

Although illustrative embodiments of the present invention have been shown and described, a latitude of modification, change and substitution is intended in the foregoing disclosure, and in certain instances, some features of the invention will be employed without a corresponding use of other features. Accordingly, it is appropriate that the appended claims be construed broadly and in a manner consistent with the scope of the invention.

What is claimed is:

1. An interactive video services system for enabling a user at a hospitality establishment to access and control presentation of digitized video programs on a television, the system comprising:

a control unit associated with said television for generating user command signals;

a room terminal electrically connected to said television for formatting and storing said user command signals;

means connected to said room terminal for entering billing information;

a systems control computer (SCS) electrically connected to said room terminal for processing said user command signals;

a property management system connected to said SCS for processing said entered billing information;

a digital video server computer (DVSC) electrically connected to said SCS and to said television for storing a plurality of digitized video programs for presentation on said television;

means connected to said SCS for storing a plurality of advertisements, said SCS further comprising:

means for automatically selecting one of said plurality of advertisements based on historical viewing habits of said user and without additional user input; and means for initiating presentation of said selected one of said plurality of advertisements on said television on a predetermined channel at a predetermined time or responsive to a queue tone;

wherein said user command signals generated using said control unit comprise select command signals for selecting one of said stored digitized video programs and control command signals for controlling presentation of said selected video program on said television by said DVSC; and wherein said SCS causes said DVSC to initiate presentation of said selected video program on said television in response to said select signals and controls said presentation of said selected video program on said television by said DVSC in response to said control signals.

2. The system of claim 1 wherein said SCS further comprise means for displaying a graphics screen on said television for assisting said user in selecting one of said stored digitized video programs.

3. The system of claim 1 wherein said entering means is a magnetic card reader.

4. The system of claim 1 further comprising an intelligent radio frequency (RF) modem connected between said SCS and said room terminal for converting signals generated by said SCS from digital to RF signal format.

5. The system of claim 4 further comprising a frequency modulator responsive to signals from said SCS for tuning the channel of said selected video program to a channel specified by said room terminal.

6. The system of claim 1 wherein said control signals comprise a signal for initiating a fast forward operation.

7. The system of claim 1 wherein said control command signals comprise a signal for initiating a rewind operation.

8. An interactive video services system for enabling a user at a hospitality establishment to access and control presentation of digitized video programs on a television, the system comprising:

a control unit associated with said television for generating user command signals;

a room terminal electrically connected to said television for formatting and storing said user command signals;

means connected to said room terminal for entering billing information;

a systems control computer (SCS) electrically connected to said room terminal for processing said user command signals; and a property management system connected to said SCS for processing said entered billing information;

a digital video server computer (DVSC) electrically connected to said SCS and to said television for storing a plurality of digitized video programs for presentation on said television;

a plurality of integrated receiver decoders (IRDs) connected to receive video data from a video distribution center, said plurality of IRDs being for processing said received video data and for routing said received video data to said SCS, to said DVSC or directly to said television responsive to said processing;

wherein said user command signals generated using said control unit comprise select command signals for selecting one of said stored digitized video programs and control command signals for controlling presentation of said selected video program on said television by said DVSC; and wherein said SCS causes said DVSC to initiate presentation of said selected video program on said television in response to said select signals and controls said presentation of said selected video program on said television by said DVSC in response to said control signals.

9. The system of claim 8 wherein said IRDs are connected to said video distribution center via a satellite delivery network and wherein said system further comprises downlink facilities connected to receive said video data from said satellite delivery network and transmit said video data to said IRDs.

10. The system of claim 8 wherein said received video data comprises digitized video programs for presentation on said television.

11. The system of claim 8 wherein said received video data comprises advertisements for presentation on said television.

12. An interactive video services system for enabling a user at a hospitality establishment to access and control presentation of digitized video programs on a television, the system comprising:

a control unit associated with said television for generating user command signals;

a room terminal electrically connected to said television for formatting and storing said user command signals;

means connected to said room terminal for entering billing information;

a systems control computer (SCS) electrically connected to said room terminal for processing said user command signals;

means connected to said SCS for storing a plurality of advertisements;

a property management system connected to said SCS for processing said entered billing information;

a digital video server computer (DVSC) electrically connected to said SCS and to said television for storing a plurality of digitized video programs for presentation on said television;

means for monitoring broadcast programming on a predetermined channel for a queue tone; and means for initiating presentation on said television of a selected one of said plurality of advertisements on said predetermined channel in place of said broadcast programming responsive to detection of said queue tone;

wherein said user command signals generated using said control unit comprise select command signals for selecting one of said stored digitized video programs and control command signals for controlling presentation of said selected video program on said television by said DVSC; and wherein said SCS causes said DVSC to initiate presentation of said selected video program on said television in response to said select signals and controls said presentation of said selected video program on said television by said DVSC in response to said control signals.

13. A method for enabling a user at a hospitality establishment to access and control presentation of digitized video programs on a television located at the hospitality establishment, the method comprising:

storing a plurality of digitized video programs in a digital video server computer (DVSC) at said hospitality establishment;

entering billing information;

processing said entered billing information for charge of said video programs to said user;

selecting one of said stored digitized video programs for presentation on said television;

presenting said selected digitized video program on said television; transmitting presentation control signals to said DVSC to control presentation of said selected digitized video program on said television;

storing a plurality of advertisements;

selecting one of said plurality of advertisements based on historical viewing habits of said user and without further involvement by said user; and initiating presentation on said television of said selected one of said plurality of advertisements on a predetermined channel at a predetermined time or responsive to a queue tone.

14. The method of claim 13 further comprising:

receiving video data from a centralized video distribution center;

processing said received video data; and routing said received video data to said DVSC, said television or a systems control computer (SCS) responsive to said processing.

15. The method of claim 13 further comprising:

storing a plurality of advertisements;

selecting one of said plurality of advertisements; and initiating presentation on said television of said selected one of said plurality of advertisements on a predetermined channel at a predetermined time.

16. An interactive video services system for enabling a user at a hospitality establishment to access and control presentation of digitized video programs on a television, the system comprising:

a control unit associated with said television for generating user command signals including a signal for initiating a bookmark operation;

a room terminal electrically connected to said television for formatting and storing said user command signals;

means connected to said room terminal for entering billing information;

a systems control computer (SCS) electrically connected to said room terminal for processing said user command signals;

a property management system connected to said SCS for processing said entered billing information;

a digital video server computer (DVSC) electrically connected to said SCS and to said television for storing a plurality of digitized video programs for presentation on said television;

wherein said user command signals generated using said control unit comprise select command signals for selecting one of said stored digitized video programs and control command signals for controlling presentation of said selected video program on said television by said DVSC: and wherein said SCS causes said DVSC to initiate presentation of said selected video program on said television in response to said select signals and controls said presentation of said selected video program on said television by said DVSC in response to said control signals.

* * * * *